United States Patent
Kumar et al.

[11] Patent Number: 5,411,611
[45] Date of Patent: May 2, 1995

[54] CONSUMABLE ELECTRODE METHOD FOR FORMING MICRO-ALLOYED PRODUCTS

[75] Inventors: Prabhat Kumar; Louis Huber, both of Allentown; Robert Engleman, Oley; Charles Heatley, Zionsville, all of Pa.

[73] Assignee: Cabot Corporation, Boston, Mass.

[21] Appl. No.: 102,358

[22] Filed: Aug. 5, 1993

[51] Int. Cl.⁶ ............................................. C21D 1/00
[52] U.S. Cl. ............................ 148/557; 420/425; 420/427
[58] Field of Search ............... 420/425, 427; 148/557

[56] References Cited

U.S. PATENT DOCUMENTS

| | | | |
|---|---|---|---|
| 1,085,951 | 2/1914 | Strohmenger | 75/10.23 |
| 2,124,262 | 7/1938 | Samuelson et al. | 75/10 |
| 2,825,641 | 3/1958 | Beall et al. | 75/10 |
| 2,958,913 | 11/1960 | Schaefer | 22/212 |
| 3,005,246 | 10/1961 | Murphy et al. | 22/216.5 |
| 3,254,149 | 5/1966 | Cooper | 13/34 |
| 3,271,828 | 9/1966 | Shelton et al. | 22/200 |
| 3,345,739 | 10/1967 | Kneip, Jr. | 29/528 |
| 3,400,206 | 9/1968 | Barth | 13/18 |
| 3,640,700 | 2/1972 | Suzuki et al. | 75/10 |
| 3,672,428 | 6/1972 | Tommaney | 164/52 |
| 3,933,474 | 1/1976 | Ham et al. | 75/10 R |
| 4,481,030 | 11/1984 | Schmidt et al. | 75/10 C |
| 4,612,040 | 9/1986 | Koizumi et al. | 75/10.65 |
| 4,844,746 | 7/1989 | Hoermann et al. | 420/427 |
| 4,856,576 | 8/1989 | Peterson | 164/495 |

FOREIGN PATENT DOCUMENTS

| 1054049 | 1/1967 | United Kingdom | 420/427 |

OTHER PUBLICATIONS

Pokross, C. Jour. of Metals, Oct. 1989, p. 46.

*Primary Examiner*—Upendra Roy
*Attorney, Agent, or Firm*—David J. Koris

[57] ABSTRACT

A method for forming a wrought product from a starting metal such as tantalum, niobium, and alloys thereof. A consumable electrode is coated with at least a first alloy layer by means which provide for uniform thickness. Sufficient power is applied to the electrode body to induce arcing to cause the starting metal and alloy layers to melt and pool in a crucible. The uniform layer on the electrode body provides a means for delivering minute quantities of alloy into a larger quantity of starting metal and facilitates a uniform and consistent arc which promotes mixing of the alloy and starting material in the crucible. The electrode body is consumed at an improved rate without an associated decrease in the final ingot yield weight. The pooled metal is allowed to solidify into an ingot. The ingot is then formed into a wrought product.

17 Claims, 7 Drawing Sheets

CONSUMABLE ELECTRODE METHOD FOR FORMING MICRO-ALLOYED PRODUCTS

FIELD OF THE INVENTION

The present invention relates to a method for producing alloys, and more particularly to a consumable electrode method having improved melting characteristics and uniform distribution of minimal quantities of at least one volatile alloy metal throughout a wrought metal product.

BACKGROUND OF THE INVENTION

The production of wrought refractory metal products containing minor quantities of a desirable alloy is well known in the art of consumable metal electrode technology. Generally, a rod or electrode of a desired starting material is electrically isolated in a holder and positioned within a reservoir capable of withstanding the elevated thermal conditions known to be associated with arc melting. A cathode source or spur is located at the base of the reservoir so that when a voltage is applied to the electrode from an exterior power supply, an electrical discharge occurs which travels between the ground source and the anode at the nose portion of the electrode body. The heat from the arcing induces melting of the electrode which in turn falls into the reservoir or crucible. After the molten pool cools, it is processed into a wrought product.

Where it is desired to alloy additional metals to the starting metal, it is known to add patches of alloyed metal as disclosed in U.S. Pat. No. 3,933,474 or to weld strips of metal to the body 10 as disclosed in U.S. Pat. No. 4,481,030. Alternately, a variety of metal bodies may be used each composed of a desired starting metal. See for example U.S. Pat. No. 2,958,913. Where the alloy is attached to the electrode periphery in a manner which raises the alloy above the periphery of the electrode to form a protrusion, arcing frequently occurs from this point to the walls of the reservoir. Alternatively, alloy strips which are recessed flush with the periphery also suffer from the same problem due to the lower resistivity of the alloy presenting a pathway of least resistance to ground. Where the alloy is in the form of welded strips, the arcing frequently travels up the side of the electrode resulting in discontinuous heating of the pooled metal and spraying of the starting metal onto the walls of the crucible. Damage to the reservoir wall and non uniform melting of the electrode body often is characteristic of these methods.

Another problem inherent in these prior art methods is that arcing to the crucible walls also introduces contaminants from the wall melt into the ingot.

A further problem inherent in these prior art method is that as the melting process is non uniform, the melt cycle is stopped short of consuming the full electrode body. A non uniform melting of the electrode therefore requires the use of larger quantities of starting material to insure the formation of a desired ingot weight.

Various attempts have been made at delivering secondary materials into the melt by spray coating. See U.S. Pat. No. 3,271,828 which discloses spray coating flux onto the electrode body.

Other attempts have placed the desired alloy material centrally within an axial core in the electrode body surrounded by the starting metal. See U.S. Pat. No. 1,085,951.

None of these prior attempts have managed to control the arc sufficiently to result in uniform melting of the electrode body or to achieve a uniform distribution of minimal quantities of alloy within a larger quantity of starting metal.

One object of the present invention is to uniformly distribute a desired quantity of alloy within a larger quantity of starting metal simultaneous with the consumable electrode body melt.

Another object of the present invention is to provide a smooth electrode body arcing-surface which is free from protrusions and which minimizes arcing to the side walls of the crucible.

Yet a further object of the present invention is to provide a means for mixing the molten alloy with the molten starting material without adding crucible contaminants to the molten pool. A process which addresses these problems would be a significant advancement in the art of producing alloyed wrought product.

SUMMARY OF THE INVENTION

Accordingly, the present invention comprises a method for forming a wrought metal product from a consumable electrode. A starting metal, including tantalum, niobium, and alloys thereof, is formed into a consumable electrode and placed in the proximity of a receiving crucible. At least one layer of alloying element(s) is applied to the electrode surface by means which provide a uniform thickness. A grounding source is provided at the base of the crucible. After the electrode body and crucible are placed under a vacuum, sufficient power is applied to the electrode body to induce arcing between the ground source and the nose of the electrode causing the starting metal and alloy layer to melt and pool in the crucible. The uniform layer on the electrode body provides a means for delivering minimal quantities of alloying elements into a larger quantity of starting metal. The consistent arcing facilitates a uniform and consistent mixing of the alloy element(s) and starting material in the crucible.

When the electrode body is consumed, the pooled metal is allowed to solidify into an ingot. The ingot is then thermo-mechanically processed into a wrought product.

In an alternate embodiment, a second layer of uniform thickness is applied over the first layer. While not wishing to be bound by any particular theory, the inventors submit that the high temperatures associated with arcing will vaporizes alloying elements which have lower melting temperatures than the starting metals. The resulting wrought product formed therefore has a lower concentration of the desired alloy. By coating the first layer with a second uniform layer of starting metal, vaporization of the alloy may be reduced.

One distinct advantage of the present invention is that the application of uniform coating layers to the electrode body promotes arcing between the ground source and the nose portion rather than to the side walls of the crucible, thereby reducing crucible damage, contamination of the ingot by crucible melting, and system down time.

Another advantage of the present invention is that by providing uniform arcing between the electrode nose and the cathode, the unintentional depositing of molten material on the crucible walls is minimized. In prior art methods, the rising level of molten metal solidifies around the deposited material forming rough surface areas on the periphery of the solid ingot. As these areas have been typically ground off, an associated quantity of valuable ingot material is lost.

Yet another advantage of the present invention is that the mixing action promulgated by the consistent arcing, promotes mixing of the alloying elements throughout the molten pool. The process of the present invention therefore results in a wrought product having a uniform distribution of minimal quantities of a desired alloy in a larger quantity of starting metal.

BRIEF DESCRIPTION OF THE DRAWINGS

Other objects, features, and advantages will become apparent to those skilled in the art from a review of the following Figures together with the detailed description of a preferred embodiment and the claims wherein:

DETAILED DESCRIPTION OF A PREFERRED EMBODIMENT

Figure 1:
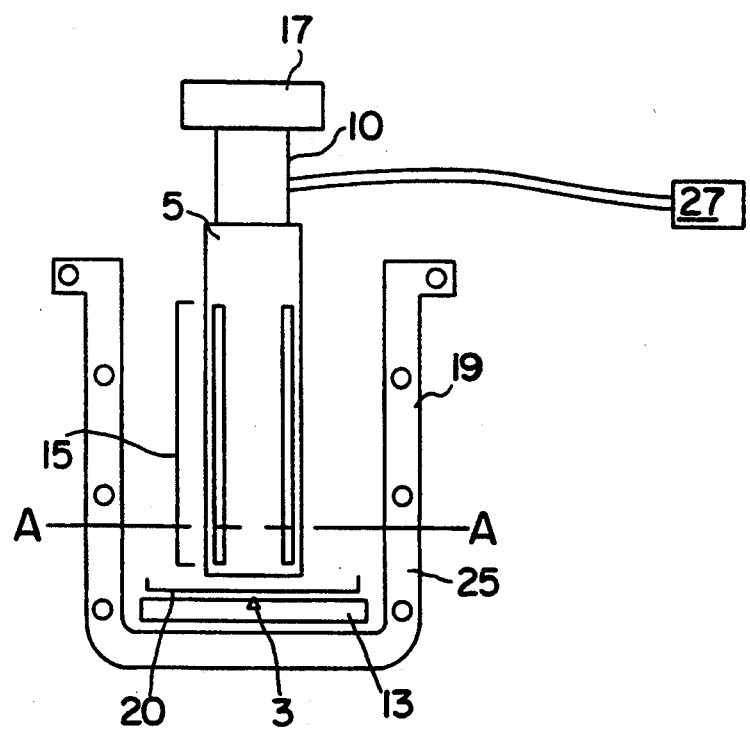
FIG. 1 is a sectional view through longitudinal axis 3 of a prior art consumable electrode and crucible.

Referring to FIG. 1, a consumable metal electrode body 10 known in the art is produced in accordance with Example 1 and illustrated herein. Body 10 is symmetrically oriented about imaginary longitudinal axis 3 and is composed of a starting metal 5. The starting material is produced by either chemically reduction or electron beam melt followed by forging and extrusions steps known in the art. Preferably, body 10 is cylindrical in shape having perimeter surface 15 and a nose portion 20. According to one prior art method, alloy bars 23 are affixed to the perimeter 15 of body 10 by known means including welding. The body is electrically isolated and positioned by support 17 adjacent to a crucible 25 so that when a charge is applied to body 10 from power supply 27, arcing occurs between nose portion 20 and ground source 30 at the bottom of crucible 25.

Crucible 25 is surrounded by cooling shell 19 through which water circulates by known means for maintaining a desired temperature. Plate 13 is situated at the bottom of the crucible and is preferably composed of the same material as the starting material. The ground source is typically formed of a small quantity of starting metal such as tantalum and is affixed to plate 13. The composition of crucible 25 is well known in the art and may consist of a range of metals having high coefficients of thermal conductivity.

Prior to initiating arcing, a vacuum housing (not shown) containing both the electrode body 10 and crucible 25, is either evacuated of air through depressurization or flooding with an inert gas such as argon.

The power supply 27 is capable of delivering a consistent charge to electrode body 10 and may be operated manually or through a control mechanism for continuous processing. Inherent in the use of an AC power supply is the cyclical nature of the arc; extinguishing and restriking with each voltage cycle. As the generation of plasma at the arc melting zone dissipates more quickly in vacuum environments, maintaining a stable continuous arc is highly desirable to secure a uniform melt.

It is also known that power demand on the power supply is a function of the diameter of the electrode "D" and plasma generating capacity "P" of the starting material of the electrode as seen by the formula:

$$D = 12.13 - 1.93\ P$$

Values for P are available in the literature and are known to those skilled in the art.

Prior art methods which result in non uniform melting of the electrode result in further destablization of the arc and an irregular temperature profile in the melt zone.

While the exact power required depends on the charge used and on the melting temperatures of the consumable electrode material 5 employed, about 16,000 to 18,500 amperes were used herein at less than 60 volts.

In operation, the temperature of the arc initiates a continuous melting of the body 10 commencing at the nose portion 20. The starting metal 5 forms a molten pool (not shown) in crucible 25 by gravity feed. The molten pool is allowed to cool in the crucible while remaining under a vacuum. It is then mechanically processed before being subject to annealing temperatures of from about 1,000° to 1,500° C. and being formed into a desired wrought product. Consumable electrode methodology has the advantage of being capable of forming large ingots such as those having a weight of starting metal of up to 5,000 lbs.

Figure 2:
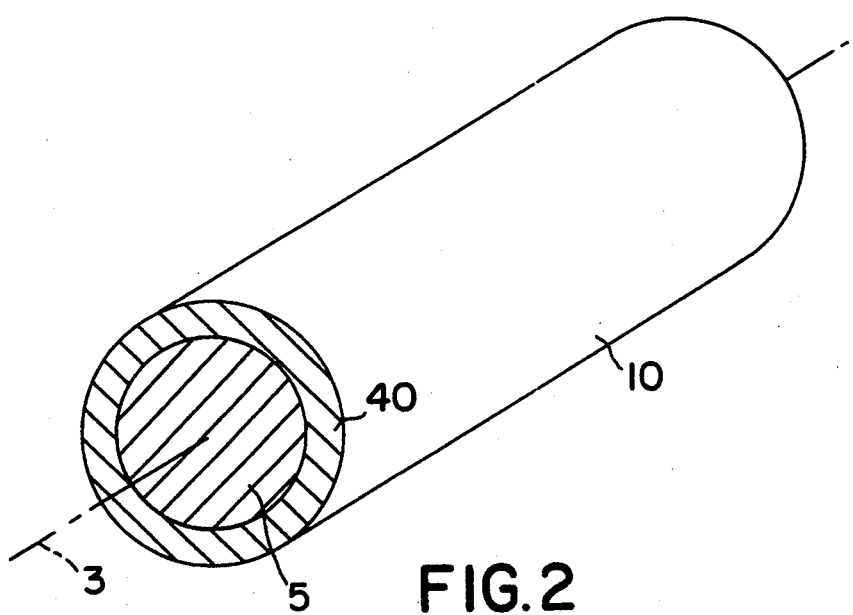
FIG. 2 is a perspective view of the electrode of the present invention viewed through line AA of FIG. 1.

FIG. 2, illustrates one embodiment of the present invention. The consumable electrode body 10 is composed of starting material 5 which is a refractory metal and preferably tantalum, niobium, or alloys thereof. At least one alloy layer 40 is uniformly deposited on the surface of body 10 by methods known in the art. Preferably, the layer is deposited by plasma spray over the electrode body perimeter surface 15 in accordance with the procedure of Example 2 discussed below. In an alternate embodiment, the layer may be deposited by electroplating techniques. The term "uniform thickness" shall be defined hereafter to be an average thickness of between 0.003 and 0.030 inches. Lower thicknesses may result in an insufficient layer over the entire surface and higher thicknesses may result in inadequate bonding with the electrode surface. While the term "alloy" herein is primarily recognized to embrace two or more metals which have chemically fused to form a new metal, the invention contemplates that the term shall also mean a single metal such as tantalum. Preferably, the first alloy layer 40 contains sufficient quantities to result in less than 2,000 ppm of yttrium nitride and silicon in the ingot.

Power supply 27 having the capacity of delivering 60 volts or less at less than 20,000 amperes is contemplated by the present invention for the melting of a tantalum starting metal 5 and a first alloy 40.

The inventors have discovered that by the application of a uniform coating to the periphery of electrode body 10, a consistent, focused, arc is formed with ground source 30 which promotes mixing of molten pool while simultaneously adding a continuous stream of starting metal and first alloy to the molten pool.

Figure 3:
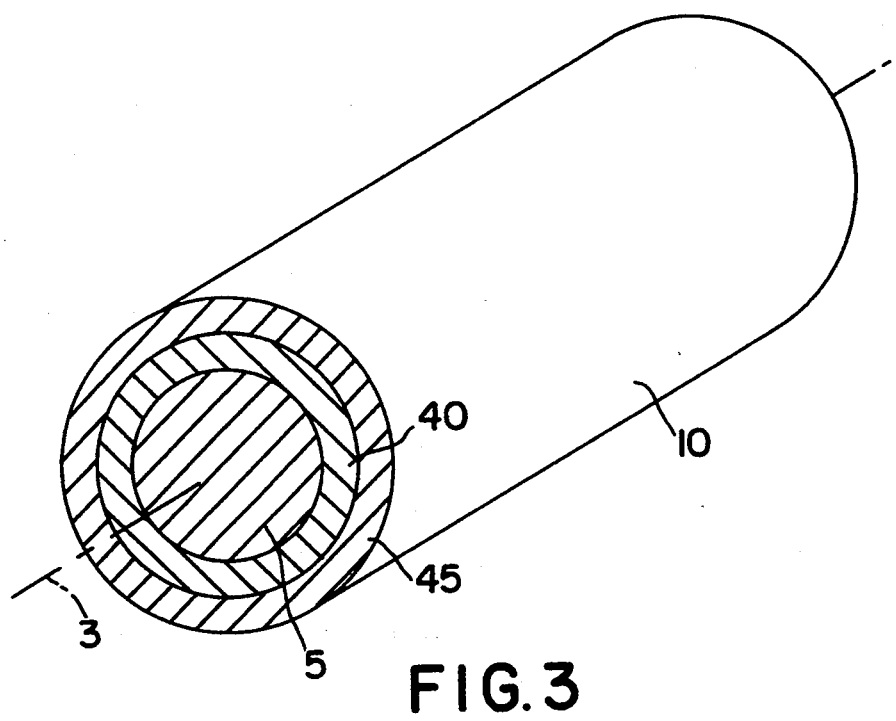
FIG. 3 is a perspective view as in FIG. 2, of an alternate embodiment of the present invention.

Referring to FIG. 3, an alternate embodiment of a consumable electrode was prepared in accordance with procedure of Example 3. A second alloy layer 45 was applied to perimeter 15 to a uniform thickness. As indicated above, the inventors theorize that the application of a second layer further reduces, the variability in arcing. The second alloy layer may also further result in improved grain structure due to more uniform distribution of alloying elements in the ingot.

The second layer material is preferably identical or similar to the starting metal. For simplicity purposes, tantalum metal was used herein as both the starting metal and second layer coating.

Figure 4A:
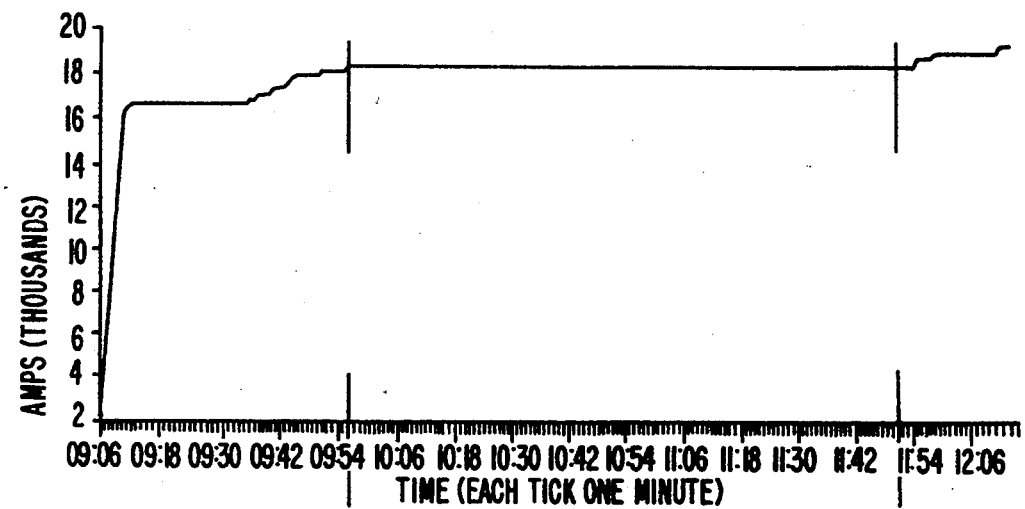
FIGS. 4A and 4B are strip chart recordings of the power utilization during arc melting of the electrode illustrated in FIG. 1.
Figure 4B:
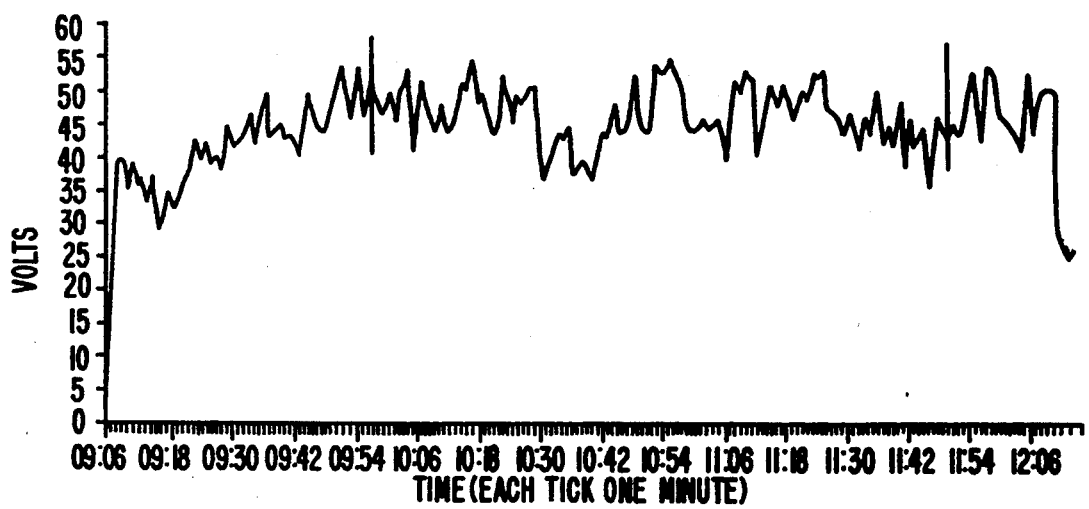

Referring to FIGS. 4A and 4B, two chart recordings are presented which illustrate the voltage and amperage requirements of the prior art consumable electrode of FIG. 1 using a starting material of tantalum. As can be readily seen, an average charge of 18,251. amperes was employed and a mean voltage of 46 volts was used. The curves demonstrate a voltage deviation from mean of about 4.5 volts. Fairly extensive shorting to the walls of the crucible resulted in an ingot with rough surface characteristics and a yield after machining of 89% of the solidified ingot weight. The maximum melt rate achieved was 32 lbs per minute. The inventors maintain that the erratic arcing is due to the alloy strips welded to the surface perimeter of the consumable electrode presenting a lower electrical resistance pathway to ground.

Figure 5A:
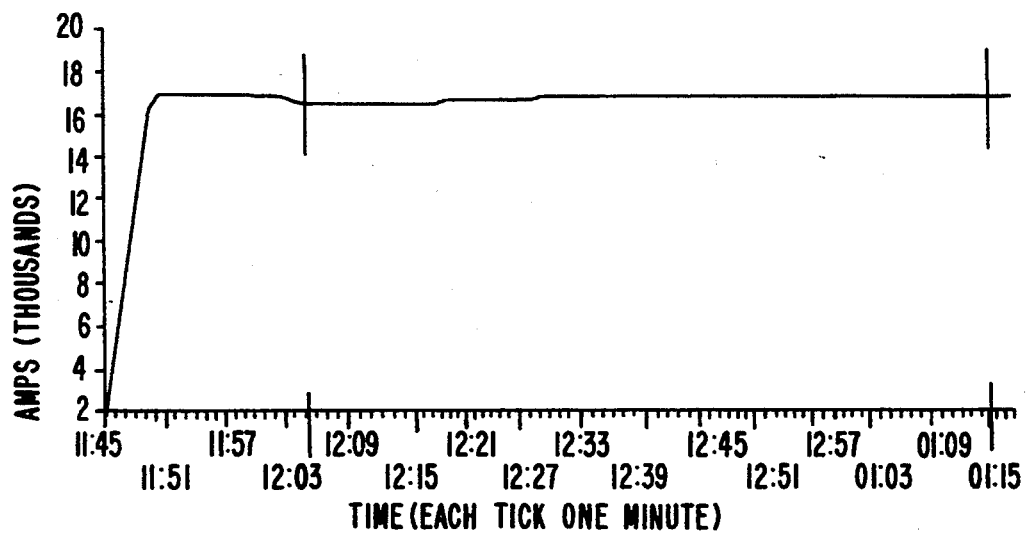
FIGS. 5A, 5B, 6A, and 6B are further strip chart recordings as in FIGS. 4A and 4B illustrating the improvement in the stability of the arc for the electrode of the present invention illustrated in FIG. 2 and alternate embodiment 3.
Figure 5B:
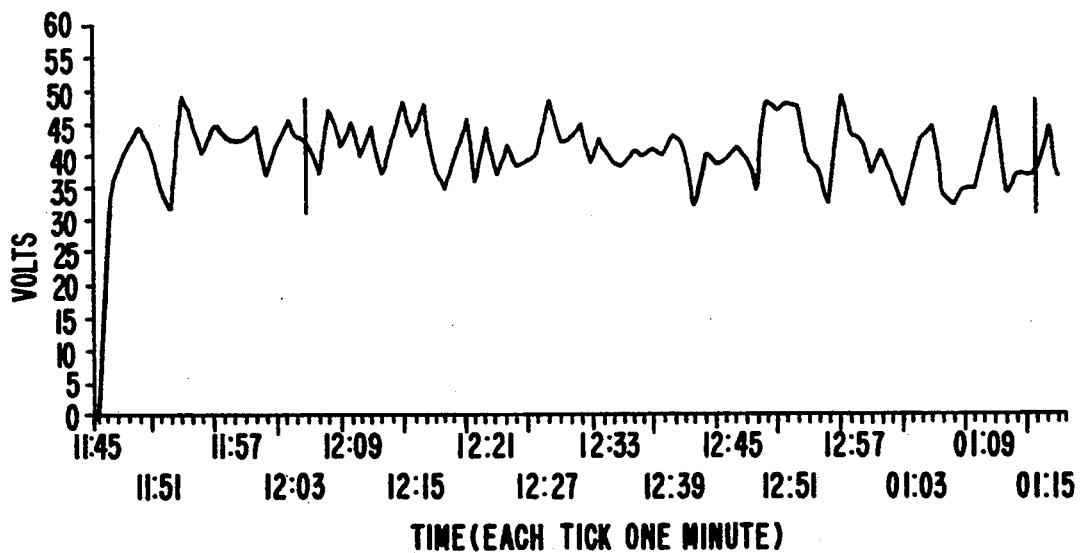

Referring to FIGS. 5A and 5B, chart recording are presented illustrating the voltage and amperage of the consumable electrode of FIG. 2. As discussed below in Example 2, a master alloy blend of silicon, yttrium nitride, and tantalum was applied by spray coating to a thickness of about 0.030 inches. Both reduced levels of mean voltage of 41 volts and mean amperes of 16,707 were used. Standard deviations for voltage of 4.44 volts and 116 amps were also achieved. This represents about a 12% reduction in mean volt used and an 8% reduction in amperage required to melt the electrode.

For a total ingot weight of 3,837 lbs. an improved maximum melting rate of 46 lbs. per minute was achieved. This represents a increase in melt rate with respect to the electrode of FIG. 4 of about 43%. The consistent arcing from the nose of the electrode resulted in requiring reduced machining of the ingot surface and a final yield weight of 93.6% of the solidified ingot.

Figure 6A:
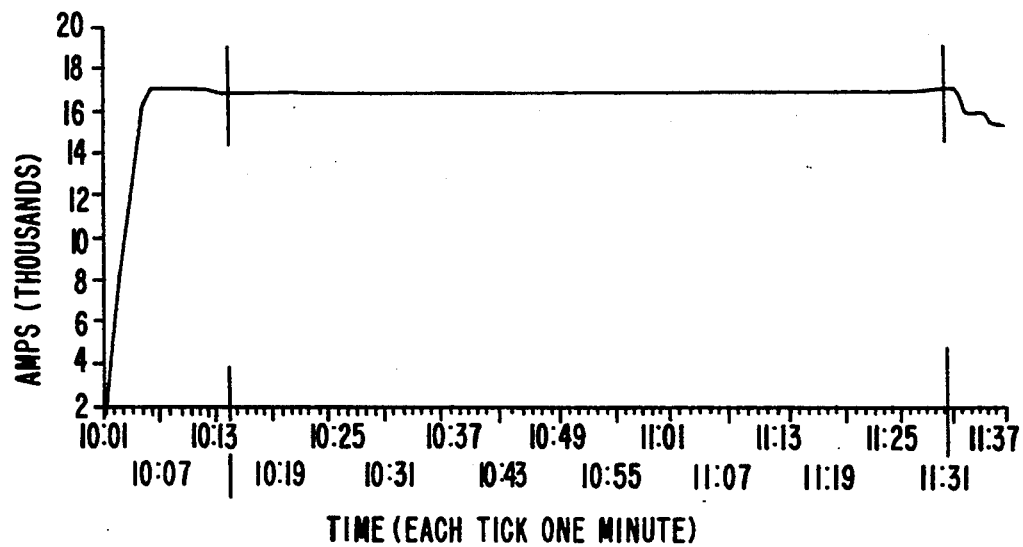
Figure 6B:
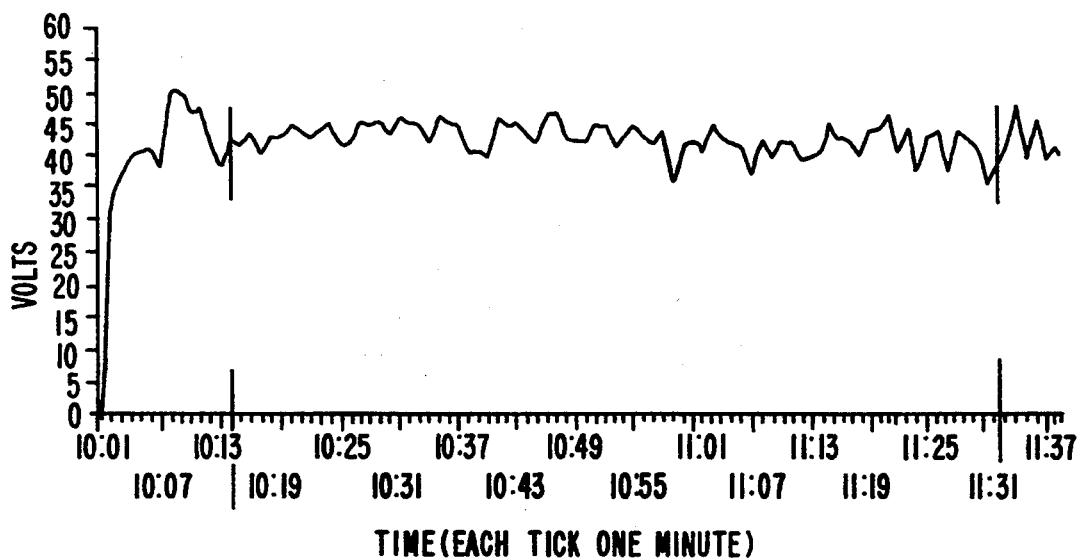

Referring to FIGS. 6A and 6B, chart recordings are presented of the power utilization of the two layer coated consumable electrode illustrated in FIG. 3. An improvement in arc stability from the electrode of FIG. 2 of about 44% in the standard deviation of arcing from a mean voltage of 41 was achieved by employing layer 45. In addition, the inventors have discovered that the application of the second layer 45 to the consumable electrode 10 also results in marginal improvement to the melt rate of about 4% over the rate of the single coated electrode of FIG. 2.

Figure 7:
FIG. 7 is a micrograph of the grain structure of the wrought metal product formed by the prior art method discussed in Example 1 below.

Referring to FIG. 7, a micrograph of the grain structure of an ingot annealed in accordance with the procedure of Example 1 is illustrated. Both large grain size and incomplete annealing is evident.

Figure 8A:
FIGS. 8A and 8B micrographs of the wrought metal product of the present invention using a consumable metal electrode prepared in accordance with the procedure of Example 2 discussed below.
Figure 8B:

The inventors maintain that the uniform arcing characteristic of the electrodes of Examples 2 and 3 facilitates mixing and uniform distribution of the alloy within the molten ingot pool. It is well established that the presence of quantities of silicon and yttrium nitride in a tantalum matrix acts to pin grain boundaries thereby preventing grain growth under annealing temperatures. (See U.S. Pat. No. 5,171,379, commonly assigned to the owner of the present invention Cabot Corporation). FIGS. 8A and 8B illustrate annealed materials taken from the ingots produced by consumable electrodes in accordance with Example 2. Uniform grain structure is clearly evident. This is in contrast to the enlarged and more uniform grain size of FIG. 7.

The objects, advantages and descriptions presented above are further supported by the following non limiting Examples.

EXAMPLE 1

A consumable metal electrode body of about 3357 lbs. was prepared by subjecting a tantalum ingot powder to forging and extruding by commonly known methods to arrive at an electrode segment having a diameter of about 9 inches (for a 13 inch diameter ingot.) The electrode body was generally cylindrical in shape with a perimeter surface and a nose portion. In accordance with prior art methods rectangularly shaped bars of alloy were welded to the perimeter of the electrode. The bars had a total alloy content of less than 2,000 ppm with about 400 ppm of yttrium nitride and 100 ppm of silicon. The body was electrically isolated and positioned by support members within the crucible and furnace. Prior to initiating arcing, the furnace housing, containing both the electrode body and the crucible, was evacuated of air by depressurizing to about 2 to $8 \times 10^{-3}$ torrs. Alternately the air may be displaced by an inert gas such as argon.

After weighing the electrode, a start up current of between 2,000 and 2,500 amperes was applied to the electrode and an arc of about ½ inches was struck. Arcing, occurring between the nose portion and the ground source at the bottom of the crucible resulted in a small pool of molten electrode in the receiving crucible on a plate of tantalum weighing about 306 lbs. Mixing of the molten pool occurred as a result of the movement of the arc about the surface of the electrode nose. The ground source was formed of a small quantity of starting metal.

After a period of 56 minutes the current requirements for the melt stabilized to a plateau of about 18,500 amps. A continuous electrode drive mechanism was initiated which maintained the nose of the electrode about ½ inch from the surface of the molten pool. Voltage varied about a mean of 46.13 volts up to a maximum voltage of 55.30 volts and a minimum voltage of 35.40 volts over a melt period of 114 minutes.

The nature of the power supply employed is generally known by those skilled in the art and is characterized by being capable of delivering a consistent charge of 20,000 amperes or less at about 60 volts.

In operation, the temperature of the arc melted the body of the electrode commencing at the nose portion. The molten starting metal collected in the crucible as a pool by gravity feed. The molten pool was allowed to cool under ambient temperature conditions while being subject to vacuum. The annealed ingot was then allowed to cool under vacuum before the plate was cut from the ingot. The ingot had a weight of 2,947 lbs. The ingot was then cleaned and surface machined to smoothness. The resulting final weight was 2,624 lbs. which is about 89% of the solidified ingot.

The ingot has a Brinell Hardness value of between 3.8 to 4.5. The ingot was then processed into a desired wrought products.

In one embodiment, analytical values of samples taken from the wrought product demonstrated 9 to 13 ppm by weight of carbon, 64 to 127 ppm by weight of oxygen, 9 ppm by weight of nitrogen, 4 ppm by weight of hydrogen, 1 to 15 ppm by weight of silicon, and about 5 ppm by weight of yttrium.

Procedure For Measuring Hardness

The wrought product was then sectioned radially and samples were taken across the diameter of the section. Rockwell B hardness values were obtained by using methodology which conforms to ASTM, E-18 Standard Test Methods.

EXAMPLE 2

A consumable electrode was prepared by the process of Example 1 having a total weight of 2953 lbs. A master blend of alloying metals and tantalum powder was prepared by mixing 1.28 lbs of silicon, 0.32 lbs of yttrium nitride, and 5.59 lbs of tantalum. Before application of the alloy blend to the ingot, the ingot was cleaned and sandblasted. The ingot was then centered on a lathe which moved a plasma gun axially while spraying. The master blend was then plasma spray coated onto the surface of the electrode body under a protective atmosphere of argon. The thickness of the coating was between about 0.005 and 0.030 inches.

The coated electrode body was then placed in a vacuum arc remelting furnace where it is secured by a non conductive holder and connected to an initial charge of about 2,000 to 2,500 amperes. A stable amperage of 16,707 was achieved after a period of 17 minutes. A mean voltage of 40.8 volts having a high of 49.40 volts and a minimum of 32.10 volts was used. The molten metal produced by the resulting arc temperature fed by gravity into the crucible where it solidified. After cutting off the plate, the ingot had a weight of 2,164 lbs. The ingot was then cleaned and surface machined to smoothness resulting in a final weight of 2,025 lbs. or 93.6% of its initial solidified weight.

The ingot had a Brinell hardness of between 4.5 and 4.7. The ingot was then processed into wrought products.

EXAMPLE 3

A consumable electrode was prepared by the process of Example 2 having a weight of 3,518 lbs. A master blend of alloying metals and tantalum powder was prepared by mixing 1.28 lbs of silicon, 0.32 lbs of yttrium nitride, and 5.59 lbs of tantalum. The master blend was then plasma spray coated onto the surface of the electrode body under a protective atmosphere of argon in accordance with the process of Example 2. The thickness of the coating was between about 0.005 and 0.030 inches. A second coating of tantalum powder was then applied by plasma spray to a thickness of 0.005 to 0.030 inches. The double layer coated electrode body was then placed in a vacuum arc remelting furnace where it was secured by a non conductive holder and connected to an initial charge of about 2,000 to 2,500 amperes. A stable amperage was reached after 14 minutes. A mean amperage value of 16,740 was achieved for at a mean voltage of 42.34 volts. After machining off surface irregularities, and removing the plate, the ingot had a final weight of about 3,150 lbs or about 92.5% of the solidified ingot weight.

The ingot had a Brinell hardness value of between 4.6 and 4.8. The ingot was then pressured into wrought products.

We claim:

1. A method for forming a wrought metal product from a consumable electrode comprising:
   forming an electrode body from a starting metal,
   applying at least a first alloy layer of uniform thickness to said body,
   positioning said body in the proximity of a crucible, said crucible having a grounding source,
   inducing an arc discharge between said body and said ground source of sufficient temperature to induce melting of said starting metal and alloy layer and forming a molten pool in said crucible,
   simultaneously mixing said molten pool while continuously melting said body,
   solidifying said molten pool into an ingot, and
   forming a wrought product from said ingot.

2. A method according to claim 1 wherein said starting metal is formed by electron beam melting.

3. A method according to claim 1 wherein said starting metal is formed by chemical reduction.

4. A method according to claim 1 wherein said starting metal is selected from the group consisting of tantalum, niobium, and alloys or mixtures thereof.

5. A method according to claim 4 wherein said first layer is deposited on said starting metal with an average thickness of between 0.003 and 0.006 inches.

6. A method according to claim 5 wherein said ground source is a quantity of tantalum metal.

7. A method according to claim 6 wherein said first layer of alloying elements comprises less than 1% by weight of said starting material, said elements further comprising yttrium nitride, silicon, and tantalum.

8. A method according to claim 7 wherein said starting metal in said electrode body comprises a weight of between about 50 and 5,000 lbs.

9. A method according to claim 8 wherein said first layer is deposited on said starting metal by plasma spraying.

10. A method according to claim 9 wherein said crucible is composed of a metal having high coefficients of thermal conductivity.

11. A method according to claim 10 wherein said arc is maintained by a voltage of between about 35 volts and about 45 volts and at an amperage of between 16,000 to about 17,000 amperes.

12. A method according to claim 11 wherein said applied amperage varies by less than 1% of the mean amperage applied to the electrode during a melt cycle.

13. A method for forming a wrought metal product from a consumable electrode comprising:
   forming an electrode body from a starting metal;
   applying a first layer of alloying elements at a uniform thickness of between 0.003 and 0.006 inches to said body;
   said first layer comprising less than 1% by weight of said starting material, said elements further comprising yttrium nitride, silicon, and tantalum;
   applying a second layer to said first layer;
   positioning said body in the proximity of a crucible, said crucible having a grounding source;

inducing an arc discharge between said body and said ground source, said discharge of sufficient temperature to induce melting of said starting material, said first alloying element layer, and said second layer;

forming a molten pool in said crucible;

simultaneously mixing said molten pool while continuously melting said body;

solidifying said molten pool into an ingot; and forming a wrought product from said ingot.

14. A method according to claim 13 wherein said starting metal is selected from the group consisting of tantalum, niobium, and alloys or mixtures thereof.

15. A method according to claim 14 wherein said second layer comprises a quantity of starting metal.

16. A method according to claim 15 wherein said arc is maintained by a voltage of between about 35 volts and about 45 volts and at an amperage of between 16,000 to about 17,000 amperes.

17. A method according to claim 16 wherein said applied amperage varies by less than 1% of the mean amperage applied to the electrode during a melt cycle.

* * * * *